Aug. 15, 1961 E. V. HILL 2,996,338
ROLLER SUPPORT FOR LINKED ELEMENTS
Filed June 15, 1959 2 Sheets-Sheet 1
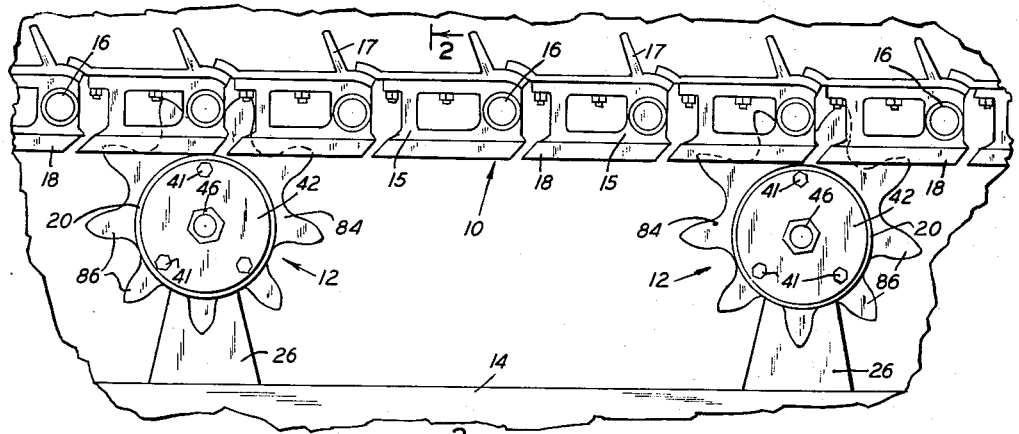
FIG.1
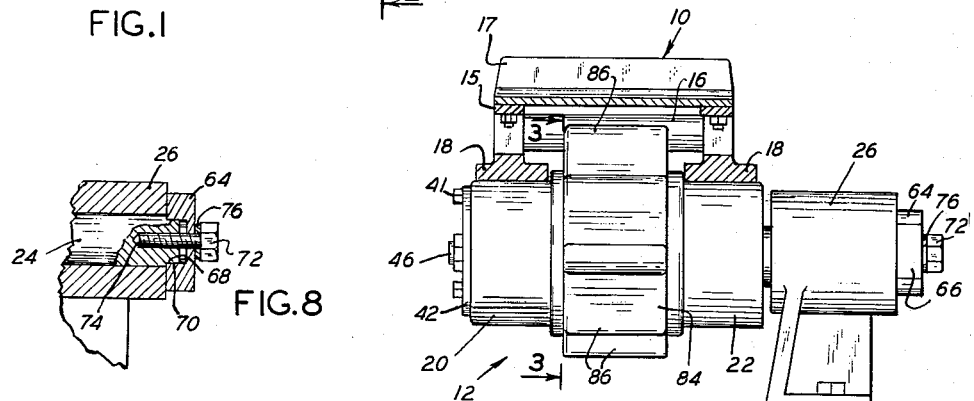
FIG.8
FIG.2
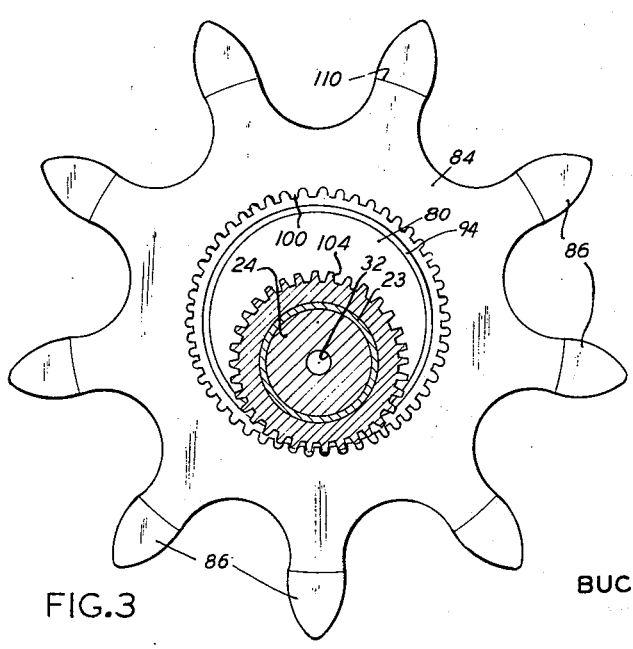
FIG.3
*INVENTOR.*
ERLAND V. HILL
BY
BUCKHORN, CHEATHAM & BLORE
*ATTORNEYS*

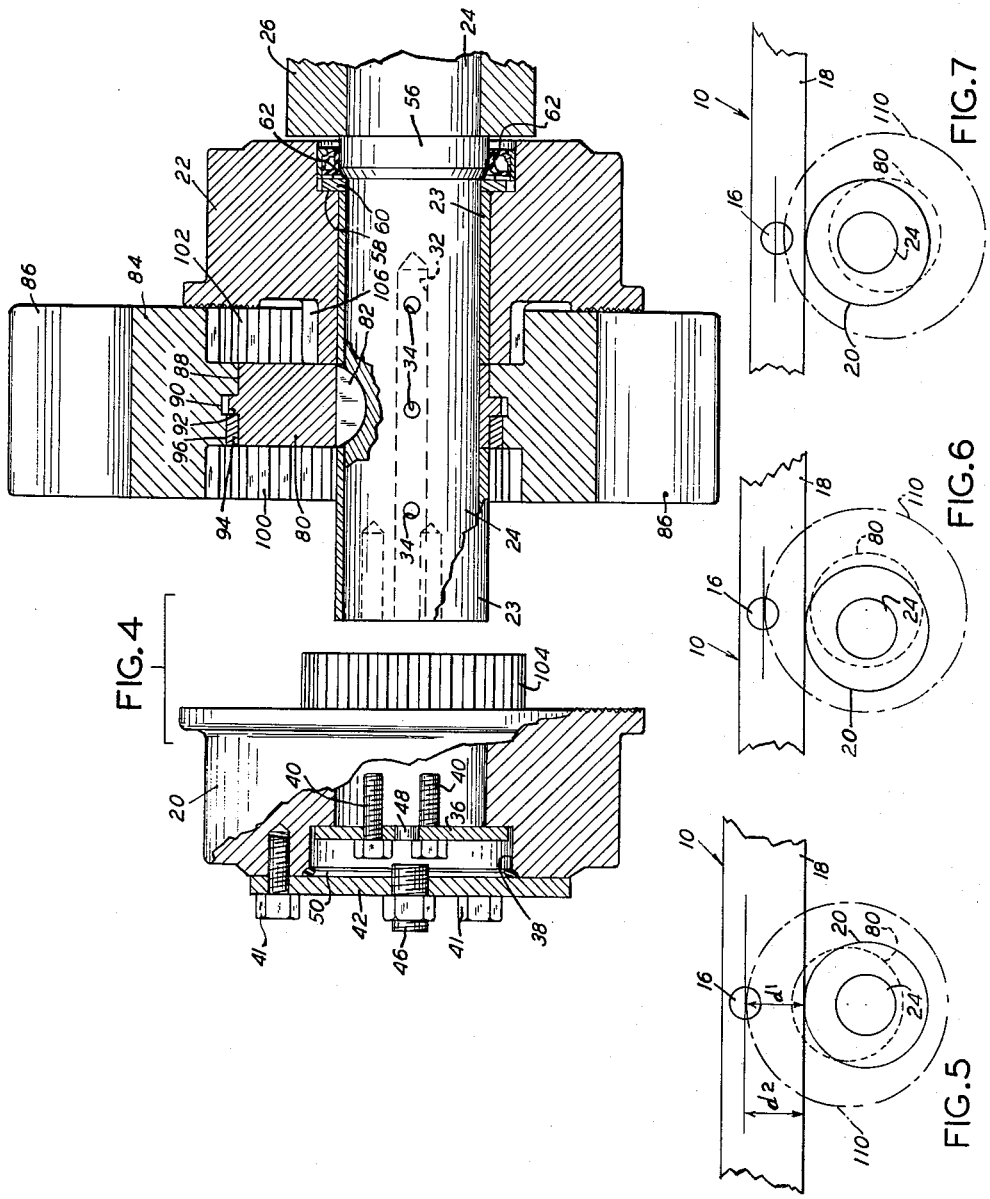

United States Patent Office 2,996,338
Patented Aug. 15, 1961

2,996,338
ROLLER SUPPORT FOR LINKED ELEMENTS
Erland V. Hill, 1206½ Main St., Vancouver, Wash.
Filed June 15, 1959, Ser. No. 820,483
9 Claims. (Cl. 305—21)

The present invention relates to a new and improved roller support for linked elements and more particularly to a new and improved roller support for the endless track of a track type vehicle.

As is well known, the endless tracks of track type vehicles are trained around large drive sprockets or wheels fore and aft of the vehicle while a plurality of small rollers are provided along the bottom reach of the vehicle to transmit the weight of the vehicle to the tracks and along the top reach of the track to support the track between the opposite drive wheels. The heavy load placed upon the bottom rollers generally forces them into such tight engagement with the track that the rollers are caused to rotate continuously with the track. However, the top rollers frequently become clogged with snow, ice, mud and similar debris and the lesser load of the track upon such rollers is frequently insufficient to force the rollers to continue to rotate against the drag caused by the clogging material. When the rollers stop, the track rails slide over the rollers causing flats to wear upon the surface of the rollers and also causing the rails to wear out because of the resulting abrasion. Similar problems have arisen in connection with the supporting of chains, link conveyors and like linked devices.

In an effort to overcome this problem, it has been proposed heretofore to provide a drive sprocket connected to the roller so as to drive the roller from the track itself. In arrangements proposed heretofore, the drive arrangement has been such that the roller is driven at a different peripheral speed than the lineal speed of the track with the result that the track continued to drag across the surface of the roller so that wear continued to result on both the track rails and the roller surfaces.

It is, therefore, an object of the invention to provide a new and improved roller assembly for supporting a linked element which will effect driving of the rollers at the same peripheral speed as the lineal speed of the linked elements supported thereby. It is a specific object to provide such a roller assembly for the endless track of a track type vehicle.

A further object is to provide a roller assembly having new and improved means for driving the rollers from the linked elements or track supported thereby.

Still another object of the invention is to provide a roller assembly having means for adjusting the same to compensate for wear on the track rails.

Other objects and advantages of the invention will become more apparent hereinafter.

In accordance with the illustrated embodiment, the roller support of the present invention comprises a pair of rollers journaled on a shaft fixed to the frame of a vehicle with the rollers positioned beneath the opposite rails of the vehicle track so as to support the same. Mounted on the shaft between the rollers is an eccentric upon which is rotatably mounted a drive sprocket. The drive sprocket is geared to the rollers so as to drive the rollers as the sprocket rotates and the sprocket is provided with teeth adapted to be engaged by the transverse pins of the endless track so as to be driven thereby. The eccentric is fixed to the shaft and the shaft is supported on the frame so that it may be rotated about its axis thereby permitting the sprocket to be raised or lowered relative to the rollers.

For a more detailed description of the invention, reference is made to the accompanying drawings wherein:

FIG. 1 is a fragmentary side elevation of the frame of an endless track vehicle showing the general relationship between the roller assembly of the invention and the upper reach of the endless track supported thereon;

FIG. 2 is a view taken substantially along line 2—2 of FIG. 1;

FIG. 3 is an enlarged sectional view taken substantially along line 3—3 of FIG. 2 showing details of the gearing arrangement between the sprocket and one of the rollers;

FIG. 4 is a partially exploded view of the roller support of the invention shown partly in section to illustrate details thereof;

FIGS. 5, 6 and 7 are diagrammatic views showing the adjustment of the device to meet varying track conditions; and FIG. 8 is a fragmentary sectional view taken substantially along line 8—8 of FIG. 2.

Referring to the drawings, the invention is illustrated in connection with a track type vehicle having an endless track 10 supported by roller assemblies 12 made in accordance with the invention from the vehicle frame indicated at 14. The illustrated track 10 is of typical construction and includes a plurality of track sections 15 pivotally connected together by transverse pins 16. The ground engaging surface of the track may be provided with lugs 17 while the opposite surface of each of the sections is provided with longitudinally extending rails 18 along each of the side edges thereof.

Referring more particularly to FIGS. 2 and 4, the roller assembly 12 comprises a pair of rollers 20, 22 which engage beneath the opposite track rails 18, the rollers being supported by roller bushings 23 upon a shaft 24 fixed by means, to be more particularly described hereinafter, in a bracket 26 mounted on the vehicle frame 14.

To provide lubrication, the shaft 24 is provided with an axial bore 32 from which radial openings 34 extend to permit the lubricant to escape to the surface of the shaft. The outer roller 20 is held on the shaft 24 by means of a retaining washer 36 which abuts against the bottom of a recess 38 in the outer surface of the roller, the washer 36 being secured to the end of the shaft 24 by means of cap screws 40. Secured to the outer side surface of the roller 20 by cap screws 41 is a cover plate 42. The cover plate 42 is provided with a grease fitting 46 through which lubrication can be injected into the space between the cover plate and retaining washer 36, the washer being provided with an opening 48 to permit lubrication to flow into the bore 32 of the shaft. An O-ring 50 may be provided to form a seal between the cover plate and the outer surface of the roller 20.

The shaft 24 is formed with a collar 56 which abuts against the bracket 26 as shown in FIG. 4. The surface of the inner roller 22 adjacent the bracket 26 is provided with a recess 58 in which is fitted a thrust washer 60 which engages against the collar 56 as shown in FIG. 4. A suitable seal, indicated at 62, is provided to prevent the entrance of foreign matter between the roller 22 and bearing 23.

Referring now to FIG. 8, the shaft 24 is secured by suitable means within the bracket 26 so that the shaft may be adjusted in its rotative position, such means including a cup washer 64 formed with tool engaging flats 66 on its outer surface. The inner surface of the cup is formed with a pair of opposed flats 68 between which is received the end portion of the shaft 24 formed with cooperative flats 70. The cup washer 64 is drawn up snugly against the bracket 26 by means of a cap screw 72 which engages within a tapped, axial opening 74 in the end of the shaft 24. A lock washer 76 may be provided to secure the cap screw 72 against accidental loosening. As will be apparent by drawing up the cap screw 72, the collar 56 and cup washer 64 can be drawn up snugly against the opposite ends of the bracket 26 so as to hold the shaft against rotative movement. By loosening the cap screw 72, the shaft can be rotated by rotating the cup washer 64.

Mounted on the shaft 24 between the rollers 20, 22 is an eccentric 80 which is fixed to the shaft by suitable means such as Woodruff key 82. Rotatably supported on the eccentric 80 is a sprocket 84 provided with teeth 86 on its periphery which project upwardly between the transverse track pins 16 so that as the track is drawn across the roller assembly, the pins 16 will cause the sprocket 84 to rotate. As is evident from FIG. 4, the sprocket 84 is supported on the eccentric 80 by means of a hub portion having a coaxial portion 88 directly engaging the eccentric 80. The intermediate portion of the hub is formed with a recess 90 within which fits an annular rib 92 formed on the eccentric 80. The opposite portion 96 of the hub is relieved to permit the sprocket to slide over the rib 92 and an annular retaining ring 94 is interposed between the eccentric 80 and the hub portion 96 to support the sprocket 84 on the eccentric.

Suitable means are provided for forming a driving connection between the sprocket 84 and the rollers 20, 22. The opposite side faces of the sprocket 84 are provided with coaxial recesses formed with teeth so as to define internal gears 100, 102 facing the rollers 20, 22, respectively. The roller 20 is provided with an integral pinion 104 which meshes with the roller 100 (see FIG. 3) and the roller 22 is similarly provided with an integral pinion 106 which meshes with the gear 102 in a similar manner.

As mentioned previously, it is desired to drive the rollers 20, 22 so that their peripheral speed is the same as the lineal speed of the track 10. Accordingly, there is a predetermined relationship between the diameter of the pitch circle 110 of the sprocket 84, the diameter of the rollers 22 and the diameters of the gears 100, 102 and pinions 104, 106 which is dependent upon the configuration of the particular track supported by the roller assembly. Referring to FIG. 5, the sprocket 84 and roller 22 and associated gearing preferably are so proportioned that with a new track 10 and the sprocket 84 in its highest position of elevation relative to the shaft 24, the pitch circle 110 will be tangent to the path of the axis of the track pins 16. Thus, in the illustrated embodiment of the invention, the pitch diameter of the sprocket 84 is twice that of the rollers 20, 22 so that in this highest position of the sprocket 84, the vertical distance $d_1$ between the rollers and the pitch line 110 on the sprocket 84 is equal to the distance $d_2$ between the center of the track pins 16 and the surface of the track rails 15. As the track rails 15 wear away, the position of the eccentric 80 can be adjusted manually by progressively rotating the shaft 24 to which the eccentric is fixed thus in turn lowering the eccentric which causes the sprocket 84 to lower. The position of the sprocket 84 is preferably adjusted so as to maintain the distance $d_1$ between the upper surface of the rollers 20, 22 and the sprocket pitch line 110 equal to the distance $d_2$ between the center of the track pins and the surface of the rail, as shown in FIG. 6, so that the pins 16 engage the sprocket substantially at the pitch line whereby the rotative speed of the sprocket relative to the track will be relatively constant thus causing the rollers to be driven at substantially the same peripheral speed as the lineal speed of the track.

The roller arrangement of the invention also permits further adjustment to compensate at least in part for the change in pitch between the tracks 15 as wear on the track pins 16 and corresponding portions of the tracks occurs. This wear is compensated for by rotating the shaft 24 so as to elevate the center of the track pins a predetermined distance above the pitch line on the sprocket for a given amount of increase in the pitch, as indicated in FIG. 7. For example, in a sprocket having 11½ inch pitch diameter and utilizing rollers having a 7 3/16 inch diameter, the eccentric 80 is adjusted to position the axis of track 16 3/32 of an inch above the sprocket pitch line for each 1/16 inch the tracks are overpitch. This ratio of adjustment will vary, of course, depending upon the particular chain involved and the diameters of the sprockets and rollers involved, but can easily be determined by those skilled in the art.

Having illustrated and described preferred embodiments of the invention, it should be apparent to those skilled in the art that the invention permits of modification in arrangement and detail. I claim as my invention all such modifications as come within the true spirit and scope of the appended claims.

I claim:

1. In a support for an endless track or the like, a shaft, a roller journaled on said shaft, a drive sprocket for said roller, means eccentrically mounting said sprocket on said shaft, and means for driving said roller from said sprocket.

2. In a roller assembly for supporting a plurality of elements linked by pivot pins, a roller mounted beneath said elements, a toothed sprocket mounted to be driven by said pivot pins as said elements move over said roller, means for driving said roller from said sprocket at a predetermined speed relative to said sprocket, and means for adjusting the position of said sprocket relative to the path of said pivot pins.

3. In a vehicle having a frame and an endless track, a support for said track comprising a roller for engaging the upper flight of said track, a shaft rotatably supporting said roller, means on said frame adjustably supporting said shaft for rotation about the axis of said shaft, an eccentric fixed on said shaft, a sprocket rotatably supported on said eccentric, and means providing a driving connection between said sprocket and said roller.

4. In a vehicle having a frame and an endless track comprising sections connected by track pins, a roller positioned beneath said track and supporting the same, a shaft mounted on said frame and rotatably supporting said roller, an eccentric on said shaft, a sprocket rotatably mounted on said eccentric having teeth engaged by said track pins so as to be driven thereby, and means forming a driving connection between said sprocket and said roller.

5. In a vehicle having a frame and an endless track, a support for said track comprising a roller for engaging the upper flight of said track, a shaft on said frame rotatably supporting said roller, an eccentric on said shaft, a sprocket rotatably supported on said eccentric and having teeth for engaging an inner part of said track to be driven thereby, means providing a driving connection between said sprocket and said roller, and means for adjusting the position of said eccentric to adjust the vertical position of said sprocket relative to said roller.

6. In a vehicle having a frame and an endless track, a support for said track comprising a pair of rollers for engaging the opposite edges of said track, a shaft rotatably supporting said rollers, an eccentric fixed on said shaft between said rollers, a sprocket rotatably supported on said eccentric for engaging said track to be driven thereby, means on said sprocket and said rollers providing a driving connection therebetween, and means on said frame adjustably supporting said shaft for rotation of the shaft about its axis to permit raising and lowering of said sprocket relative to said rollers.

7. In a vehicle having a frame and an endless track, a support for said track comprising a pair of rollers for engaging the opposite edges of said track, a shaft rotatably supporting said rollers, an eccentric fixed on said shaft between said rollers, a sprocket rotatably supported on said eccentric for engaging said track to be driven thereby, gear means on said sprocket and said rollers providing a driving connection therebetween, and means on said frame adjustably supporting said shaft for rotation of the shaft about its axis to permit raising and lowering of said sprocket relative to said rollers.

8. In a vehicle having a frame and an endless track comprising a plurality of track sections pivotally connected by transverse pins, each of said sections having longitudinally extending rails along the edges thereof on the surface opposite the ground engaging surface thereof, means for supporting said track in the upper run thereof comprising a pair of rollers engaging said rails, a shaft rotatably supporting said rollers, an eccentric fixed on said shaft between said rollers, a sprocket rotatably mounted on said eccentric and having teeth for engaging said transverse pins so as to be driven thereby, means adjustably supporting said shaft on said frame to permit rotative adjustment of said shaft to vary the height of said sprocket relative to said rollers, and means drivingly connecting said sprocket to said rollers.

9. In a vehicle having a frame and an endless track comprising a plurality of track sections pivotally connected by transverse pins, each of said sections having longitudinally extending rails along the side edges thereof on the surface opposite the ground engaging surface thereof, means for supporting said track in the upper run thereof comprising a pair of rollers engaging said rails, a shaft rotatably supporting said rollers, an eccentric fixed on said shaft between said rollers, a sprocket rotatably mounted on said eccentric and having teeth for engaging said transverse pins so as to be driven thereby, said sprocket being formed with a pair of internal gears one on each of the opposite sides thereof concentric with the axis of said sprocket, said rollers each being provided with a pinion engaging the said sprocket gear on the corresponding side of sprocket, and means adjustably supporting said shaft on said frame to permit rotative adjustment of said shaft to vary the height of said sprocket relative to said rollers.

References Cited in the file of this patent
UNITED STATES PATENTS

| | | |
|---|---|---|
| 1,330,253 | Fuller | Feb. 10, 1920 |
| 1,926,244 | Sargent | Sept. 12, 1933 |
| 2,393,369 | Hait | Jan. 22, 1946 |
| 2,827,337 | Buffum | Mar. 18, 1958 |